United States Patent [19]

Boettcher

[11] 4,168,363
[45] Sep. 18, 1979

[54] ELASTOMERIC CABLE JACKET REPAIR COMPOSITION

[75] Inventor: Robert J. Boettcher, Stillwater, Minn.

[73] Assignee: Minnesota Mining and Manufacturing Company, St. Paul, Minn.

[21] Appl. No.: 892,783

[22] Filed: Apr. 3, 1978

[51] Int. Cl.² ............................................. C08G 18/32
[52] U.S. Cl. ................................ 528/48; 260/31.8 N; 260/33.6 UB; 260/33.2 R; 260/33.8 UB; 428/425; 528/75; 528/76; 528/85
[58] Field of Search ................... 260/31.8 N, 33.6 UB, 260/33.2 R, 33.8 UB; 528/48, 75, 76, 85; 428/425

[56] References Cited

U.S. PATENT DOCUMENTS

| | | | |
|---|---|---|---|
| 2,756,875 | 7/1956 | Yochim | 206/219 |
| 2,929,800 | 3/1960 | Hill | 260/33.6 UB |
| 2,932,385 | 4/1960 | Bollmeier et al. | 156/308 |
| 2,967,795 | 1/1961 | Bollmeier et al. | 264/269 |
| 3,074,544 | 1/1963 | Bollmeier et al. | 206/219 |
| 3,087,606 | 4/1963 | Bollmeier et al. | 260/40 R |
| 3,963,680 | 6/1976 | O'Keefe et al. | 528/85 |
| 4,010,146 | 3/1977 | Russell et al. | 528/85 |
| 4,024,307 | 5/1977 | Brahm et al. | 528/85 |
| 4,060,583 | 11/1977 | Groves et al. | 264/272 |

*Primary Examiner*—Maurice J. Welsh
*Attorney, Agent, or Firm*—Cruzan Alexander; Donald M. Sell; Gerald F. Chernivec

[57] ABSTRACT

A curable composition especially adapted for the repair of damaged elastomeric cable jacket materials comprises reactive isocyanate and polyol components in defined concentrations which exhibits electrical and physical properties comparable to the jacket material and has excellent adhesion thereto. Initially the composition can be a liquid having sufficiently low viscosity permitting it to be poured in a mold around the damaged cable jacket, or it can be thickened to a self-supporting grease-like consistency. After curing in contact with a neoprene-based elastomer, the composition exhibits an adhesion thereto of at least about 7.0 pounds per inch.

9 Claims, No Drawings

ELASTOMERIC CABLE JACKET REPAIR COMPOSITION

BACKGROUND OF THE INVENTION

This invention relates to a curable two-part electrically insulating composition for the permanent repair of elastomeric cable jackets.

Mining cables, for example, typically utilize an outer jacket material which is elastomeric. Such elastomeric jackets are typically based on neoprene, chlorosulfonated polyethylene, nitrile/polyvinylchloride, and chlorinated polyethylene elastomers.

Currently, one common method of repairing damaged elastomeric cable jackets consists of wrapping a vulcanizable tape over the damaged area, placing the taped area in a suitable sized metal mold, inserting this entire assembly in a heated press and press-curing for a sufficient period of time. It has been found, however, that such vulcanizable tapes have a relatively short shelf life, the process of utilizing same requires considerable skilled labor to properly wrap the tape over the jacket area to be repaired, and considerable energy expenditure is necessary to maintain the heated press continuously at the tape curing temperature.

To overcome these problems, two-part reactive systems have been proposed for use in such cable jacket repair. The two-part system is mixed immediately prior to undertaking the repair, the mixture having a controllable cure time. However, it has been found that such two-part systems do not afford the desired elasticity, toughness, and abrasion resistance to the repaired jacket, and more importantly do not exhibit the requisite adhesion to the elastomeric cable jacket to ensure permanency of repair.

It has now been ascertained that a unique combination of materials can be prepared as a two-part curable system, which substantially alleviates the aforementioned difficulties and further provides the desirable properties of low viscosity and moisture insensitivity prior to curing thereof, together with controllable cure times, necessary electrical insulation characteristics, elasticity, toughness, and abrasion-resistance after curing. In addition, and most importantly, when cast onto elastomeric cable jacket materials for repair thereof, the composition exhibits outstanding adhesion thereto. Furthermore, the composition is capable of curing in a reasonable length of time without necessity of heat. Also, the material can be simply poured into a suitable mold around the cable jacket, thereby simplifying the application and repair procedure.

SUMMARY OF THE INVENTION

In accordance with the invention, there is provided a composition, normally stored in two parts, which when cured in contact with a neoprene-based elastomer has adhesion thereto of at least about 7 pounds per inch and has electrical and physical properties comparable to said neoprene-based elastomer, the composition comprising a reactive admixture of, based on total polymer solids, (a) from about 20 to about 40 percent by weight of at least one isocyanate compound having from about 1.0 to 2.5 NCO groups per molecule and a molecular weight of less than about 5,000;

(b) from about 50 to about 70 percent by weight of at least one polyol containing from about 1.0 to about 4.0 terminal hydroxyl groups per molecule, and having a molecular weight of between about 500 and about 5,000;

(c) up to about 20 percent by weight of a polyol having a molecular weight of between about 90 and about 500 and containing from about 1.0 to about 4.0 terminal hydroxyl groups per molecule;

(d) up to about 15 percent by weight of a thickening agent;

(e) from about 10 to about 70 percent by weight of a liquid non-reactive diluent material;

(f) up to about 50 percent by weight of filler materials; and (g) up to about 5 percent by weight of at least one catalyst capable of promoting the urethane formation in said polyurethane compound.

The composition has been found to have excellent utility in the repair of elastomeric cable jackets, and when cured in place on the damaged portion of the cable jacket, exhibits excellent adhesion thereto, and has comparable physical and electrical properties relative to the cable jacket material itself.

DETAILED DESCRIPTION OF THE INVENTION

My inventive composition is in essence a two-part liquid system which when mixed and cured provides a urethane elastomer. In essence, one liquid component basically contains therein an isocyanate reactant, while the other liquid component basically contains a polyol reactant.

In the isocyanate component, isocyanates of NCO functionality of between about 1 and 2.5, and more preferably about 2, are useful herein, the isocyanate having a molecular weight of less than about 5,000, and more preferably less than about 3,500. Examples of isocyanates which fit within the scope of my invention include methylene diphenyl isocyanate, isophorone diisocyanate, dimer acid diisocyanate, and tolylene diisocyanate. The isocyanate component can also contain non-reactive liquid diluents or extenders conventionally used in the art, examples of which include petroleum derived oils, phthalate esters, liquid mixtures of isomeric terphenyls, and halogenated hydrocarbons; pigments; fillers; non-reactive flame retardants; etc.

The polyol-based component should contain polyols of hydroxyl functionality between about 1 and 4, and more preferably between about 2 and 3, having a molecular weight of from between about 500 and about 5,000, and more preferably 1,000 to 3,000. Examples of such polyols include polyoxypropylene glycol, polyester glycol, polybutadiene glycol, styrene-butadiene copolymer glycol, acrylonitrilebutadiene copolymer glycol, polyoxyethylene glycol, polyoxytetramethylene glycol, and polycaprolactone glycol. In addition, a second polyol reactant having a same hydroxyl functionality range as the aforementioned polyol reactant, having a molecular weight of between about 90 and about 500, may be included. Examples of such polyols include polyoxypropylene glycol, polyoxyethylene glycol, polyoxytetramethylene glycol, polyalkyl glycol, polycaprolactone glycol, and N-hydroxyalkyl substituted aniline derivatives.

In addition to the foregoing polyol reactants, again non-reactive diluents or extenders or other materials as defined above can be included in this second liquid component.

In conventional fashion by a pre-reaction mechanism, the isocyanate component can be prereacted with a portion of the polyol component to form an isocyanate-terminated prepolymer, which when subsequently reacted with the remaining polyol component will produce a urethane elastomer having the requisite properties.

The isocyanate should be present in a stoichiometric amount, i.e., in sufficient quantity to provide an NCO/OH ratio of from about 0.9 to about 1.1.

Non-reactive liquids or solids containing a substantial halogen content therein can be included if flame retardancy of the repair composition is desired. Examples of such compounds include halogenated biphenyl, halogenated biphenyl oxide, and halogenated alicyclics. In addition, materials which conventionally act synergistically with halogens to increase flame resistance, such as antimony trioxide, can be included therewith.

Compounds which serve as antioxidants, such as oxydecyl bis(3,5-t-butyl-4-hydroxyphenyl)propionate can similarly be included.

Also contained in the polyol component are compounds which are capable of serving as catalysts for the isocyanate/hydroxyl reaction and are suitable for the particular combination of polyols and isocyanates chosen. Examples of such compounds include triethylene diamine, tetravalent tin compounds, metal acetyl acetonates, and organo mercury compounds.

It is anticipated that the composition will be simply poured into a mold around the damaged elastomeric cable jacket, and that a pourable liquid is therefore the most suitable state for the composition to be in. In this instance, the composition should be of sufficiently low viscosity to be pourable, i.e., below about 10,000 centipoise at room temperature.

In some instances, it may be also desirable to utilize the composition as a self-supporting grease or paste. If such is desirable, thickening agents can be added to one or the other of the liquid components. Exemplary thickening agents include diprimary amines such as ortho phenylene diamine or ortho diethyl bisaniline.

Based on total polymer solids, which are the reactive components, i.e., isocyanates and polyols, the isocyanate portion should constitute about 20 to about 40, and preferably 27 to 30 percent by weight thereof. The higher molecular weight polyol component should comprise from about 50 to about 70 percent, and preferably about 60 percent, by weight of the polymer solids. Similarly, the lower molecular weight polyol component can constitute up to about 20, and preferably 11 to 17, percent by weight of polymer solids. Up to about 15, and preferably up to about 6, percent by weight polymer solids of a thickening agent can be included, if desired. Liquid diluent or extender concentration should be from about 10 to about 70, preferably 20 to 50, percent by weight of polymer solids.

Up to about 50, and preferably up to about 40, percent by weight of polymer solids of fillers, pigments, etc. can be included. Catalysts for promoting the urethane formation can be included up to about 5, and preferably up to about 0.5 percent by weight.

A composition of the invention is typically stored in two parts prior to introduction to a damaged cable jacket, with the reactive isocyanate (or isocyanate-terminated prepolymer) being present in one part, and the reactive polyol being present in the second part. As is well known in the art (see, for example, U.S. Pat. Nos. 2,932,385; 2,967,795; 2,756,875; 3,074,544; 3,087,606; and 4,060,583), two-part compositions may conveniently be stored until use in separate compartments of a multicompartment unitary package. The compartments are typically separated by a membrane or seam which may be ruptured to allow mixing of the separate parts immediately prior to use.

The adhesion of the cured composition to a clean neoprene-based elastomeric cable jacket material should be at least about 7.0 pounds per inch to function effectively as a repair composition. Similarly, the cured composition should be able to provide similar weathering, temperature, abrasion, etc. resistance as the cable jacket material itself.

The invention will now be more specifically described by the following non-limiting examples, wherein all parts are by weight unless otherwise specified.

EXAMPLE 1

To a glass 3-necked resin reactor were added the following:

| Component | Parts |
| --- | --- |
| Poly bd R-45HT, tradename for a hydroxyl-terminated polybutadiene having 20 percent by weight vinyl side chains, an OH functionality of from 2.2 to 2.4, and a molecular weight of about 2800, commercially available from Arco Chemical | 43.91 |
| NIAX 2025, tradename for a polyoxypropylene glycol of about 2,000 molecular weight, commercially available from Union Carbide Corp. | 16.46 |
| Isonol C-100, tradename for N,N-bis(2-hydroxypropyl)aniline, commercially available from Upjohn Co. | 10.38 |
| Dipropylene glycol | 6.03 |
| Irganox 1076, tradename for an antioxidant, octadecyl bis(3,5-t-butyl-4-hydroxyphenyl) propionate, commercially available from Ciba-Geigy Corp. | 0.98 |
| DUP, tradename for diundecyl phthalate, commercially available from Monsanto Chemical | 21.34 |

The mixture was agitated and heated to 95° C. and vacuum slowly applied until a vacuum of less than 10 Torr was obtained. After two hours, the vacuum was broken with dry nitrogen. The mixture was cooled to 65° C., after which 0.90 part of DABCO 33LV, tradename for a dipropylene glycol solution of triethylene diamine was added and the batch was mixed for 30 minutes. The viscosity at 24° C. was 2100 centipoise.

Utilizing a similar reaction vessel, 9.6 parts of diundecyl phthalate were added and warmed to 60° C., following which 39.88 parts of Isonate 143L, tradename for diphenyl methane diisocyanate, commercially available from the Upjohn Co., were added. To this mixture were added 5.72 parts of NIAX 2025, following which the mixture was heated to 115° C., at which time 15.53 parts of Poly bd R-45HT were added. The mixture was then cooled to 105° C. and agitated at the temperature for 1 hour. The viscosity at 24° C. was 1000 centipoise.

The first and second parts were then mixed together in the ratio of 1.0/0.71 parts, respectively, which represented an equivalent NCO/OH ratio of 1.05. A 100 gram mass was found to gel in 9.3 minutes, utilizing a Sunshine Gel Meter.

After curing a sample for 16 hours at 65° C., the Shore A hardness, measured per ASTM D 2240, was 80. Tensile strength and elongation, measured per ASTM D 412, were 734 pounds per square inch and 237 percent, respectively. Tear strength, per Die C of ASTM D 624, was 121 pounds per inch width. The glass transition temperature, measured with a DuPont Model 900 differential thermal analysis unit, was −78° C. The abrasion index, measured per ASTM D 1630, was 40. Dielectric strength, per ASTM D 149, was 433 volts per mil.

Blocks of the cured composition of 1 inch by 2 inches by ½ inch dimensions were aged for one week at 121° C. to determine heat stability, and the samples were found not to deform.

To determine hydrolytic stability, samples of the aforementioned dimensions were boiled in water for one week, whereupon the average weight gain was found to be 2.21 percent.

Adhesion of the cured elastomer composition to cable jacket material is an extremely important property, and a test has been devised to ascertain whether a composition will meet the 7.0 pound per inch adhesion limitation.

A neoprene-based elastomer was prepared by first masticating and banding 100 parts of Neoprene W, tradename for a polychloroprene commercially available from E. I. DuPont, on a conventional two-roll mill at room temperature. To the polymer was then added, and dispersed, 20 parts of Sterling SO, a carbon black commercially available from Cabot, and 2.0 parts of Age-Rite HP-S, a blend of about 65 parts of alkylated diphenyl amines and 35 parts diphenyl-p-phenylene diamine available from R. T. Vanderbilt.

The mill rolls were then chilled with cooling water and a blend of 2.0 parts of Octamine, tradename for a reaction product of diphenylamine and diisobutylene available from Uniroyal Chemicals, 3.0 parts of Heliozone, tradename for a blend of petroleum waxes from E. I. DuPont, 60.0 parts of Dixie Clay, tradename for a kaolinitic clay from R. T. Vanderbilt, 6.0 parts of Sundex 790, tradename for an aromatic oil (ASTM D-2226, Type 102) from Sun Oil, and 2.0 parts of ZO-9, tradename for a blend of natural waxes and wax derivatives from Harwick Standard Chemical were added to the polymer. Then 22.0 parts of TRD-90, tradename for 90 percent by weight Red Lead ($Pb_3O_4$) in an EPDM binder from Wyrough and Loser, Inc., 1.0 part of Thionex, tradename for tetramethylthiuram monosulfide from E. I. DuPont, and 0.75 part of sulfur were blended into the polymer, following which the composition was sheeted out at about one-half inch thickness.

The material was then pressed into one inch by 6 inch by ¼ inch bars and cured in a conventional heated platen press at 330° F. for 15 minutes under 40,000 pounds per square inch platen pressure.

The mixed elastomer composition of my invention was then cast onto the bars in ¼ inch thicknesses and cured. A portion of each bar was masked with Teflon tape prior to casting so as to provide a lip of cured composition which a conventional tensile testing machine could grasp. A 180° peel test was then performed by the tensile machine, with the jaws being pulled at a 5 millimeter per second rate. In this manner, adhesion to the neoprene-based composition material was 43 pounds per inch.

When similar adhesion tests were undertaken utilizing chlorosulfonated polyethylene, nitrile/polyvinyl chloride, and polyvinyl chloride-based elastomers, adhesion was found to be 17, 30, and 17.7 pounds per inch, respectively.

EXAMPLE 2

This example illustrates preparation of a self-supporting composition of grease-like consistency.

The first part of Example 1 was prepared with the addition of 6.0 parts of Zeolith L, tradename for a suspension of molecular sieve (4A zeolite) powder in castor oil from Mobay, Inc., and 4.0 parts of o-diethyl bis aniline thereto.

For the second part, which was again prepared as per Example 1, 11.54 parts of diundecyl phthalate, 47.93 parts of Isonate 143L, 6.87 parts of NIAX 2025, and 18.66 parts of Poly bd R-45HT were utilized.

The two parts were mixed in a ratio of 1.1/0.85, whereupon the resultant mixture thickened rapidly to a grease-like consistency, the degree of thickening being controlled by the quantity of o-diethyl bis aniline. The mixture remained in this thickened state for several minutes, and in this form was suitable for trowelling or filling unsupported voids.

The mixture cured in a manner similar to Example 1 to an elastomer having a Shore A hardness of 78, tensile strength of 1,087 pounds per square inch, elongation of 240 percent, tear strength of 188 pounds per inch width, and a dielectric strength of 354 volts per mil. When tested per the adhesion test with neoprene, chlorosulfonated polyethylene, and nitrile/polyvinyl chloride-based elastomers, the adhesion was found to be 41, 20, and 64 pounds per inch, respectively.

EXAMPLES 3–10

Compositions were prepared as per Example 1 as follows:

Table 1

|  | Example 3 | | Example 4 | | Example 5 | | Example 6 | |
| --- | --- | --- | --- | --- | --- | --- | --- | --- |
|  | Part A | Part B | Part A | Part B | Part A | Part B | Part A | Part B |
| Isonate 143L |  | 39.88 |  | 39.88 |  | 39.88 |  | 39.88 |
| IPDI$_{(1)}$ |  |  |  |  |  |  |  |  |
| Poly bd R-45HT | 63.74 | 22.42 | 43.91 | 15.53 | 43.91 | 15.53 | 43.91 | 15.53 |
| NIAX 2025 |  |  | 16.46 | 5.72 | 16.46 | 5.72 | 16.46 | 5.72 |
| Isonol C-100 | 10.38 |  | 10.38 |  | 10.38 |  | 10.38 |  |
| Dipropylene glycol | 6.03 |  | 6.03 |  | 6.03 |  | 6.03 |  |
| Irganox 1076 | 0.98 |  | 0.98 |  | 0.98 |  | 0.98 |  |
| Diundecyl Phthalate | 21.34 | 9.60 |  |  |  |  |  |  |
| Dioctyl Phthalate |  |  | 21.34 | 9.6 |  |  |  |  |
| Santicizer 711$_{(2)}$ |  |  |  |  | 21.34 | 9.60 |  |  |
| HB-40$_{(3)}$ |  |  |  |  |  |  | 21.34 | 9.60 |
| Kenplast G$_{(4)}$ |  |  |  |  |  |  |  |  |
| FR-300 BA$_{(5)}$ |  |  |  |  |  |  |  |  |
| Antimony oxide |  |  |  |  |  |  |  |  |
| Zeolith L |  |  |  |  |  |  |  |  |

Table 1-continued

| | | | | |
|---|---|---|---|---|
| Dabco 33LV | 0.90 | 0.90 | 0.90 | 0.90 |
| Iron acetyl acetonate | | | | |

| | Example 7 | | Example 8 | | Example 9 | |
|---|---|---|---|---|---|---|
| | Part A | Part B | Part A | Part B | Part A | Part B |
| Isonate 143L | | 39.88 | | 41.54 | | |
| IPDI(1) | | | | | | 35.92 |
| Poly bd R-45HT | 43.91 | 15.53 | 44.36 | 17.90 | 36.72 | 18.14 |
| NIAX 2025 | 16.46 | 5.72 | 14.79 | 5.96 | 13.18 | 6.68 |
| Isonol C-100 | 10.38 | | 10.84 | | 12.97 | |
| Dipropylene glycol | 6.03 | | 6.63 | | 8.28 | |
| Irganox 1076 | 0.98 | | 1.00 | | 1.22 | |
| Diundecyl Phthalate | | | 21.75 | 10.00 | 26.68 | |
| Dioctyl Phthalate | | | | | | |
| Santicizer 711(2) | | | | | | |
| HB-40(3) | | | | | | |
| Kenplast G(4) | 21.34 | 9.60 | | | | |
| FR-300 BA(5) | | | 38.00 | | | |
| Antimony oxide | | | 13.00 | | | |
| Zeolith L | | | 1.23 | | | |
| Dabco 33LV | 0.90 | | 0.50 | | | |
| Iron acetyl acetonate | | | | | 0.25 | |

(1)isophorone diisocyanate, commercially available from Weba Chemie
(2)mixture of phthalate esters of 7, 9, and 11 carbon atom alcohols, commercially available from Monsanto Corp.
(3)partially hydrogenated mixture of isomeric terphenyls available from Monsanto Chemical
(4)aromatic hydrocarbon available from Kenrich Petrochemicals
(5)decabromo diphenyl oxide from Dow Chemical When tested as per Example 1 for the physical properties of the composition, the following results were obtained:

Table 2

| | Example 3 | Example 4 | Example 5 | Example 6 | Example 7 | Example 8 | Example 9 |
|---|---|---|---|---|---|---|---|
| Viscosity @24° C., cps., Part A, Part B | 2440, 1220 | 1620, 920 | 1280, 840 | 1600, 920 | 1140, 760 | 2400, 1120 | 1300, 760 |
| Gel time, 100 g. mass, minutes | 6.9 | 8.9 | 8.2 | 8.1 | 7.9 | 15.0 | 8.4 |
| Mix ratio, Part A/Part B | 1.44 | 1.41 | 1.41 | 1.41 | 1.41 | 2.02 | 1.65 |
| Hardness, Shore A | 77 | 80 | 80 | 80 | 80 | 75 | 65 |
| Tensile strength, psi | 833 | 750 | 724 | 764 | 850 | 953 | 907 |
| Elongation, percent | 167 | 217 | 180 | 207 | 203 | 310 | 613 |
| Tear strength, lb./in. | 114 | 128 | 130 | 138 | 147 | 157 | 156 |
| Glass transition temp., °156 C. | −75 | −80 | −78 | −64.5 | −75 | −79 | −74 |
| Abrasion index | 87 | 76 | 79 | 33 | 90 | 26 | — |
| Dielectric strength, v./mil. | 353 | 360 | 349 | 481 | 476 | 348 | 487 |
| Heat stability | No deform | No deform | No deform | No deform | No deform | No deform | No deform |
| Hydrolytic stability, percent weight gain | 1.30 | 2.13 | 0.89 | 1.41 | 0.38 | 2.05 | 1.51 |
| Peel adhesion, pounds per inch | | | | | | | |
| Neoprene | 22.4 | 41.3 | 45.4 | 41.5 | 35.9 | 56 | 53.3 |
| Chloro sulfonated polyethylene | 13.2 | — | — | — | — | 50.5 | 72.2 |
| Nitrile/PVC | 33.4 | 12.3 | 10.3 | 10.0 | 15.2 | — | 59.2 |

What is claimed is:

1. A two-part composition disposed in a single unitary package with the parts of the composition stored in separate compartments within the package and adapted upon mixing for use in the repair of elastomeric cable jacket materials, the composition comprising, based on total polymer solids:
   (a) from about 20 to about 40 percent by weight of at least one isocyanate compound having from about 1.0 to 2.5 NCO groups per molecule and a molecular weight of less than about 5,000;
   (b) from about 50 to about 70 percent by weight of at least one polyol containing from about 1.0 to about 4.0 terminal hydroxyl groups per molecule, and having a molecular weight of between about 500 and about 5,000;
   (c) up to about 20 percent by weight of a polyol having a molecular weight of between about 90 and about 500, and containing from about 1.0 to about 4.0 terminal hydroxyl groups per molecule;
   (d) up to about 15 percent by weight of a thickening agent;
   (e) from about 10 to about 70 percent by weight of a liquid non-reactive diluent material;
   (f) up to about 50 percent by weight of filler materials; and
   (g) up to about 5 percent by weight of at least one catalyst capable of promoting a reaction between said isocyanate compound and said polyol compound, said composition, when cured in contact with a neoprene-based elastomer in accordance with the test described, having an adhesion thereto of at least about 7.0 pounds per inch.

2. The composition of claim 1, wherein said composition, after mixing of said parts, is a pourable liquid.

3. The composition of claim 1, wherein said composition, after mixing of said parts, is self-supporting and of grease-like consistency.

4. A polyurethane compound comprising the reaction product of an admixture, based on total polymer solids, of:
   (a) from about 20 to about 40 percent by weight of at least one isocyanate compound having from about 1.0 to 2.5 NCO groups per molecule and a molecular weight of less than about 5,000;
   (b) from about 50 to about 70 percent by weight of at least one polyol containing from about 1.0 to about 4.0 terminal hydroxyl groups per molecule, and having a molecular weight of between about 500 and about 5,000;
   (c) up to about 20 percent by weight of a polyol having a molecular weight of between about 90 and about 500, and containing from about 1.0 to about 4.0 terminal hydroxyl groups per molecule;
   (d) up to about 15 percent by weight of a thickening agent;
   (e) from about 10 to about 70 percent by weight of a liquid non-reactive diluent material;
   (f) up to about 50 percent by weight of filler materials; and
   (g) up to about 5 percent by weight of at least one catalyst capable of promoting a reaction between said isocyanate compound and said polyol compound,
said compound, when formed in contact with a neoprene-based elastomer in accordance with the test described, having an adhesion thereto of at least about 7.0 pounds per inch.

5. A process for repairing damaged elastomeric cable jacket materials comprising the steps of
   (a) placing said damaged elastomeric cable jacket material in a housing suitable for retaining a composition for the repair of said material;
   (b) introducing into said housing a composition comprising
      (1) from about 20 to about 40 percent by weight of at least one isocyanate compound having from about 1.0 to 2.5 NCO groups per molecule and a molecular weight of less than about 5,000;
      (2) from about 50 to about 70 percent by weight of at least one polyol containing from about 1.0 to about 4.0 terminal hydroxyl groups per molecule, and having a molecular weight of between about 500 and about 5,000;
      (3) up to about 20 percent by weight of a polyol having a molecular weight of between about 90 and about 500, and containing from about 1.0 to about 4.0 terminal hydroxyl groups per molecule;
      (4) up to about 15 percent by weight of a thickening agent;
      (5) from about 10 to about 70 percent by weight of a liquid non-reactive diluent material;
      (6) up to about 50 percent by weight of filler materials; and
      (7) up to about 5 percent by weight of at least one catalyst capable of promoting a reaction between said isocyanate compound and said polyol compound; and
   (c) allowing said composition to cure to an elastomeric state, whereupon said composition, after curing, has an adhesion to said elastomeric cable jacket material of at least about 7.0 pounds per inch.

6. The process of claim 5, wherein said composition is a liquid and is poured into said housing.

7. A process for preparing damaged elastomeric cable jacket material comprising the steps of:
   (a) contacting said damaged elastomeric cable jacket material with a composition comprising:
      (1) from about 20 to about 40 percent by weight of at least one isocyanate compound having from about 1.0 to 2.5 NCO groups per molecule and a molecular weight of less than about 5,000;
      (2) from about 50 to about 70 percent by weight of at least one polyol containing from about 1.0 to about 4.0 terminal hydroxyl groups per molecule, and having a molecular weight of between about 500 and about 5,000;
      (3) up to about 20 percent by weight of a polyol having a molecular weight of between about 90 and about 500, and containing from about 1.0 to about 4.0 terminal hydroxyl groups per molecule;
      (4) from about 1.0 to about 15.0 percent by weight of a thickening agent;
      (5) from about 10 to about 70 percent by weight of a liquid non-reactive diluent material;
      (6) up to about 50 percent by weight of filler materials; and
      (7) up to about 5 percent by weight of at least one catalyst capable of promoting a reaction between said isocyanate compound and said polyol compound; and
   (b) allowing said composition to cure to an elastomeric state, whereupon said composition, after curing, has an adhesion to said elastomeric cable jacket material of at least about 7.0 pounds per inch.

8. The process of claim 7, wherein an elastomeric sheet material is placed over said composition disposed on said damaged elastomeric cable jacket material prior to curing of said composition.

9. The process of claim 8, wherein said sheet material is held in contact with said composition by retaining means until curing of said composition is complete.

* * * * *